United States Patent
Kim et al.

(10) Patent No.: US 6,985,203 B2
(45) Date of Patent: Jan. 10, 2006

(54) SEALING ON ALIGNMENT FILMS OF LIQUID CRYSTAL DISPLAY DEVICE AND FABRICATING METHOD THEREOF

(75) Inventors: Jeong Rok Kim, Kyongsangbuk-do (KR); Lim Su Lee, Daegu-kwangyokshi (KR); Kyung Kyu Kang, Kyongsangnam-do (KR); Johann Jong, Kyongsangbuk-do (KR); Myung Woo Nam, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/638,496

(22) Filed: Aug. 12, 2003

(65) Prior Publication Data
US 2004/0032559 A1   Feb. 19, 2004

(30) Foreign Application Priority Data
Aug. 14, 2002  (KR)  .................. P10-2002-0048216

(51) Int. Cl.
  *G02F 1/1339*  (2006.01)
  *G02F 1/1337*  (2006.01)
(52) U.S. Cl. .................. 349/153; 349/123; 349/190
(58) Field of Classification Search .............. 349/123, 349/153, 190
See application file for complete search history.

(56) References Cited

U.S. PATENT DOCUMENTS

| | | | | |
|---|---|---|---|---|
| 4,252,414 A | * | 2/1981 | Kinugawa et al. | 349/132 |
| 5,317,434 A | * | 5/1994 | Ohara | 349/106 |
| 5,684,555 A | * | 11/1997 | Shiba et al. | 349/149 |
| 6,288,764 B1 | * | 9/2001 | Zhang et al. | 349/152 |
| 6,400,438 B1 | * | 6/2002 | Noritake et al. | 349/149 |

FOREIGN PATENT DOCUMENTS

JP      2-296223     * 12/1990

* cited by examiner

*Primary Examiner*—Tarifur R. Chowdhury
(74) *Attorney, Agent, or Firm*—Morgan, Lewis & Bockius LLP

(57) ABSTRACT

A liquid crystal display and a fabricating method thereof are disclosed in the present invention. The liquid crystal display having a display area displaying a picture and a non-display area outside the display area, wherein the non-display area includes an alignment layer on at least one of upper and lower substrates and formed from an end portion of the display area, and a sealant between the upper substrate and the lower substrate, wherein the sealant at least partially overlaps the alignment layer in a vertical direction.

12 Claims, 3 Drawing Sheets

US 6,985,203 B2

SEALING ON ALIGNMENT FILMS OF LIQUID CRYSTAL DISPLAY DEVICE AND FABRICATING METHOD THEREOF

This application claims the benefit of the Korean Patent Application No. P2002-048216 filed on Aug. 14, 2002, which is hereby incorporated by reference.

BACKGROUND OF THE INVENTION

1. Field of the Invention

The present invention relates to a liquid crystal display device and a fabricating method thereof, and more particularly, to a liquid crystal display device and a fabricating method thereof having a reduced non-display area.

2. Discussion of the Related Art

Generally, a liquid crystal display device controls the light transmittance of liquid crystals in liquid crystal cells that are arranged in a matrix form, such that a picture is displayed in accordance with video signals. A liquid crystal display device includes an active area in which the liquid crystal cells are arranged in a matrix form. Further, a liquid crystal display includes a non-active area having driving circuits for driving the liquid crystal cells in the active area.

FIG. 1 is a plane view illustrating a liquid crystal display device of the related art. FIG. 2 is a cross-sectional view of the liquid crystal display device taken along line II—II of FIG. 1. Referring to FIGS. 1 and 2, the related art liquid crystal display device includes an actual display area 4 having upper and lower substrates bonded to each other with a sealant. Liquid crystal cells (not shown) are positioned between the upper and lower substrates for displaying a picture. Each of the liquid crystal cells contains a plurality of liquid crystal molecules.

More particularly, a sealant 2 is to bond the upper substrate 11 and the lower substrate 1 to each other, as shown in FIG. 1. An upper alignment layer 10 on the upper substrate 11 and a lower alignment layer 12 on the lower substrate 1 determine the initial molecular arrangement of liquid crystal molecules. A non-display area is adjacent to the sealant 2 between the upper substrate 11 and lower substrate 1 within the boundaries of the space between the upper and lower alignment layers 10 and 12.

The actual display area 4 of the liquid crystal display device includes the area of the upper substrate 11 where a black matrix 20, color filters 16, common electrodes 14, and an upper alignment layer 10 are formed thereon, and the lower substrate 1 where thin film transistors 25, 26, 27, 28, and 30, pixel electrodes 22, and a lower alignment layer 12 are formed thereon and facing into the upper substrate 11. As shown in FIG. 2, spacers 24 sustain a gap between the upper substrate 11 and the lower substrate 1. Liquid crystal molecules (not shown) are injected in the space between the upper substrate 11, the lower substrate 1, and the spacers 24.

On the upper substrate 11, the black matrix 20 is formed in a matrix form to divide the surface of the upper substrate 11 into a plurality of cell areas in which the color filters 16 are formed to prevent optical interference between adjacent cells. The three primary colors of red, green, and blue are sequentially formed on the upper substrate 11 as color filters 16. As shown in FIG. 2, each of the color filters 16 of the three primary colors is formed by depositing and patterning a material, absorbing white illumination and transmits only light with a specific wavelength, such as red, green or blue, on the entire surface of the upper substrate 11 where the black matrix 20 is formed. The common electrode 14 is formed of indium tin oxide (ITO), which is a transparent conductive material, on the color filter where the black matrix 20 and the color filters 16 are formed. Subsequently, a polyimide (PI) is printed on the common electrode 14 and rubbed to form the upper alignment layer 10, thereby completing the upper substrate 11.

On the lower substrate 1, the TFT switching the liquid crystal cell includes a gate electrode 25 projected from a gate line (not shown), a source electrode 28 projected from a data line (not shown), and a drain electrode 30 connected to a pixel electrode 22 through a contact hole 23. Further, the TFT includes a gate insulating layer 6 to insulate the gate electrode 25, the source electrode 28, and the drain electrode 30, and semiconductor layers 26 and 27 to form a channel region between the source electrode 28 and the drain electrode 30 as a result of a gate voltage supplied to the gate electrode 25. More particularly, the TFT selectively supplies a data signal from the data line to the pixel electrode 22 in response to a gate signal from the gate line.

The pixel electrode 22 is located in a cell area defined by the data lines and the gate lines and is formed of a transparent conductive material with a high light transmittance. The pixel electrode 22 is formed on a protective layer 8 deposited on the entire surface over the lower substrate 1 and is electrically connected to the drain electrode through the contact hole 23 formed in the protective layer 8. After printing the lower alignment layer 12 over the lower substrate 1 in which the pixel electrode 22 is formed, a rubbing process is carried out to complete the lower substrate 1.

A sealant 2 is formed along the peripheral area of the upper substrate 11 and the lower substrate 1. The sealant 2 is formed by a printing method or a dispensing method. Subsequently, spherical-shaped spacers 24 are dispersed between the substrates. Then, the upper substrate 11 and the lower substrate 1 are positioned to be attached to each other. Liquid crystal molecules are then injected and sealed between the substrates, thereby completing the liquid crystal display device.

FIG. 3 is a plane view illustrating a non-display area of the liquid crystal display device shown in FIG. 1. As shown in FIG. 3, the non-display area E includes an alignment layer area A formed at a specific area from an end portion 36 of the actual display area and a sealant area C where the sealant 2 is formed. Further, a buffer area B is formed between the alignment layer area A and the sealant area C, and an area D is defined between the sealant 2 and an end portion 32 of the upper substrate 11.

To further reduce the size and weight of an LCD panel, it is desirable to reduce the size of the non-display area while maintaining the size of the actual display area. However, the alignment layer area A formed in the non-display area E has to have a specific area from the end portion 36 of the actual display area because of the material characteristic of polyimide as well as because polyimide printing equipment cannot be precisely controlled when printing polyimide. More specifically, the non-display area E has to have the alignment layer area A with a specific gap from the end portion 36 of the valid display area to the end portion 34 of the alignment layer. Further, the buffer area B should be secured because the sealant 2 in the paste state may be dispersed to form the sealant 2, and because a margin of error for the printing equipment used in printing polyimide must be considered.

Although the sealant area C can be reduced in order to reduce the size of the non-display area E, such a reduction reduces the bonding area where the sealant 2 is formed. If the bonding area of the sealant 2 is reduced, the adhesion between the upper and lower substrates 11 and 1 decreases substantially, which may cause the liquid crystals to leak out. Further, if the width of the sealant 2 is reduced due to the reduction of the sealant area C, cell gaps become non-uniform, thereby generating a stain. Due to such problems, there is a limitation in reducing the width of the sealant 2. Thus, a new structure and a method are needed to reduce the non-display area while maintaining the size of the actual display area in the liquid crystal display panel.

SUMMARY OF THE INVENTION

Accordingly, the present invention is directed to a liquid crystal display device and a fabricating method thereof that substantially obviate one or more of problems due to limitations and disadvantages of the related art.

Another object of the present invention is to provide a liquid crystal display and a fabricating method thereof having a reduced non-display area.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device having a display area displaying a picture and a non-display area outside the display area, wherein the non-display area includes an alignment layer on at least one of upper and lower substrates formed from an end portion of the display area, and a sealant between the upper substrate and the lower substrate, wherein the sealant at least partially overlaps the alignment layer in a vertical direction.

In another aspect of the present invention, a fabricating method of a liquid crystal display device having a display area displaying a picture and a non-display area outside the display area includes forming an alignment layer on at least one of an upper substrate and a lower substrate from an end portion of the display area, and forming a sealant between the upper substrate and the lower substrate such that the sealant at least partially overlaps the alignment layer in a vertical direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the Drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 4:
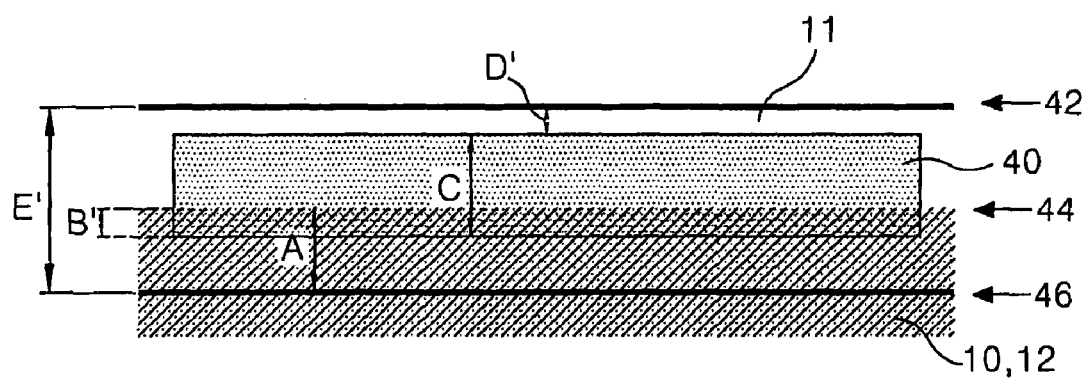
FIG. 4 is a plane view illustrating a liquid crystal display device including a non-display area according to an embodiment of the present invention.
Figure 5:
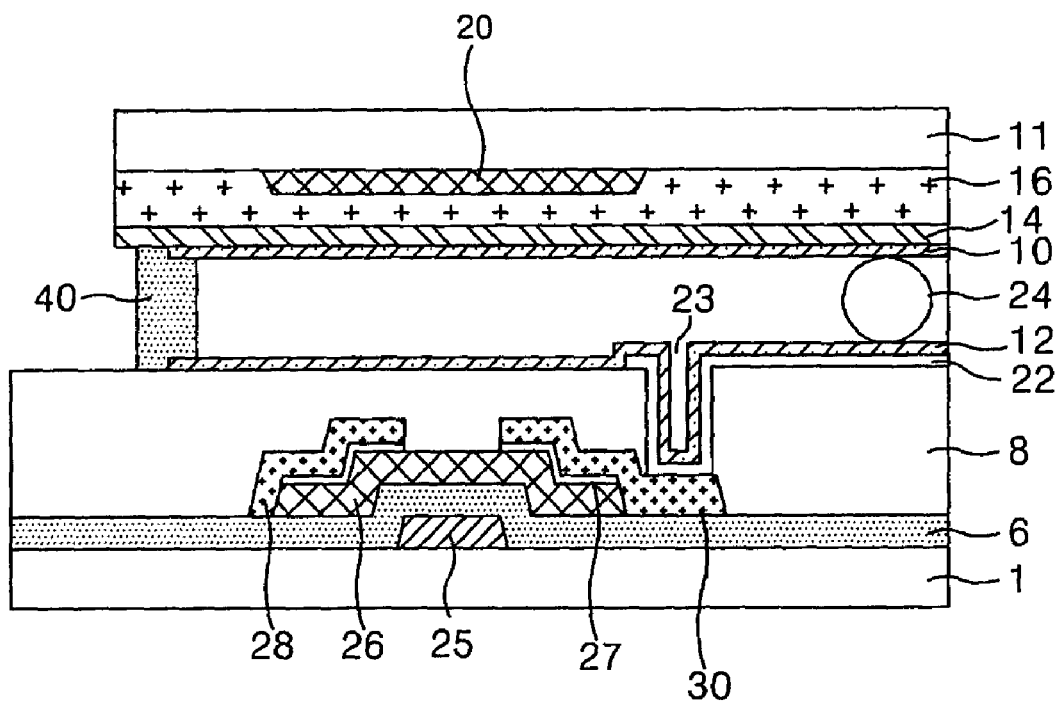
FIG. 5 is a cross-sectional view illustrating the liquid crystal display device shown in FIG. 4.

FIG. 4 is a plane view illustrating a liquid crystal display device including a non-display area according to an embodiment of the present invention. FIG. 5 is a cross-sectional view illustrating the liquid crystal display device shown in FIG. 4. Referring to FIGS. 4 and 5, the liquid crystal display device according to the present invention has a sealant partially overlapping the alignment layer in the non-display area in the vertical direction, while maintaining the same size of the actual display area.

As shown in FIG. 4, the non-display area E' includes an alignment layer area A formed at a specific area from an end portion 46 of an actual display area, a sealant area C where the sealant 40 bonds upper and lower substrates (not shown) to each other, an overlapping area B' where the alignment layer area A and the sealant area C at least partially overlap each other, and an outermost area D' defined between the sealant 40 and an end portion 42 of the upper substrate 11.

Figure 1:
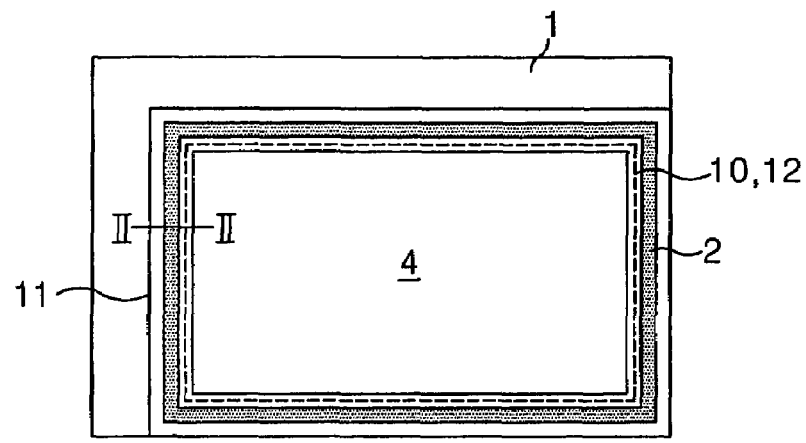
FIG. 1 is a plane view illustrating a liquid crystal display device of the related art.
Figure 2:
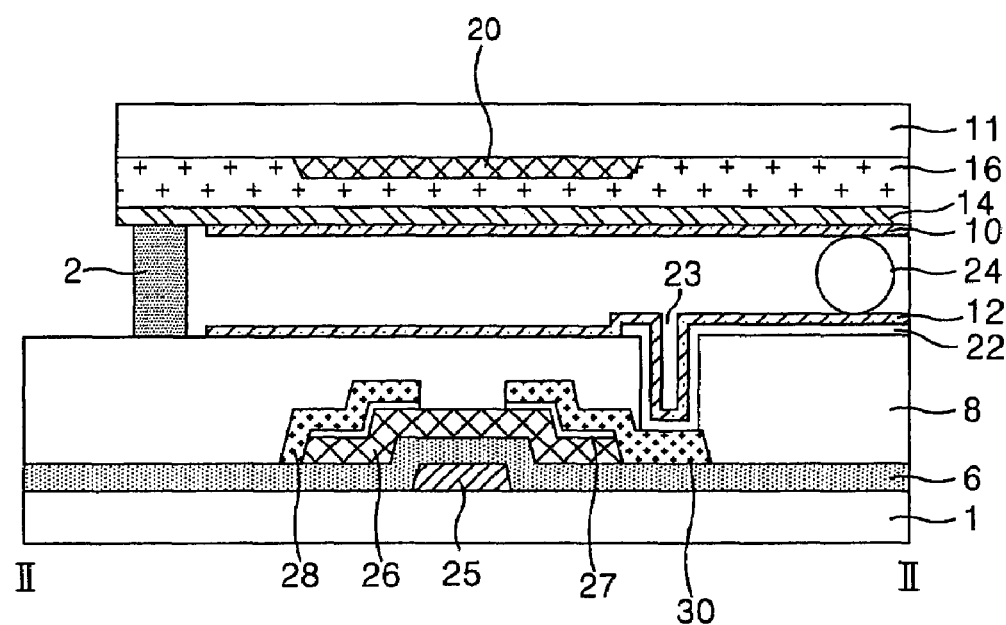
FIG. 2 is a cross-sectional view of the liquid crystal display device taken along line II—II of FIG. 1.

The alignment layer area A is formed within the non-display area E' to have a specific area from the end portion 46 of the actual display area because of the material characteristics of polyimide, and also because polyimide printing equipment cannot be controlled precisely when printing polyimide. The sealant area C is formed to have a width occupying a specific area, so as to avoid a stain from forming and to prevent leakage of liquid crystal between the upper and lower substrates. Thus, the width of the alignment layer area A or the sealant area C cannot be reduced significantly. Both the alignment layer area A and the sealant area C may be formed to have the same area as that of the related art due to the equipment and material characteristics, as described above. In view of such factors, the present invention includes an overlapping area B' where the alignment layer area A partially overlaps the sealant area C to reduce the overall size of the non-display area E' in the liquid crystal display device. In other words, even if the alignment layer area A and the sealant area C maintain their respective conventional width, the sealant 40 is dispensed to overlap the alignment layer area A such that the alignment layer area A partially overlaps the sealant area C. As a result, the size of the non-display area E' is reduced by as much as the overlapping area B' and the buffer area B of the related art shown in FIG. 2. For example, the sealant 40 may overlap the alignment layer area A by as much as 0 to about 61% of the width of the sealant 40, and it is possible to overlap by more than that. Further, the outermost area D' is formed to have a width narrower than that of the related art.

Figure 3:
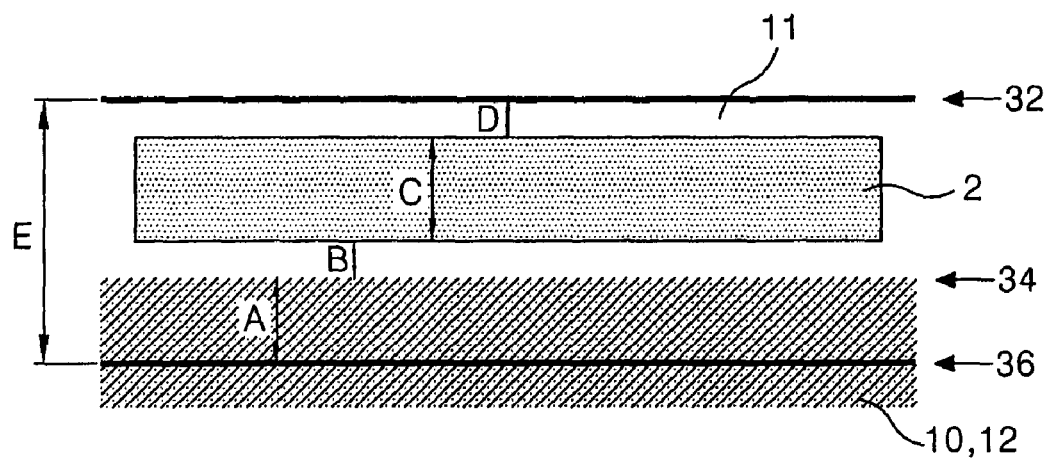
FIG. 3 is a plane view illustrating a non-display area of the liquid crystal display device shown in FIG. 1.

Referring to FIGS. 3 and 4, the non-display area E of the liquid crystal display panel of the related art will be compared to the non-display area E' according to the present invention.

Table 1 is a data table where the width of the non-display area E in the related art is compared to the width of the non-display area E' formed in the present invention. Herein, as a result of an experiment using polyimide masks where the polyimide-printing margin of the alignment layer area is about 0.6 millimeters (mm), 0.9 millimeters (mm), and 1.2 millimeters (mm), the best result can be obtained when the printing width of polyimide is about 0.9 millimeters (mm).

TABLE 1

|   | Related art (mm) | Present invention (mm) |
|---|---|---|
| A | 0.9 | 0.9 |
| B | 0.4 | −0.3 |
| C | 1.1 | 1.1 |
| D | 0.4 | 0.3 |
| Total | 2.8 | 2.0 |

In the above Table 1, A represents an alignment layer print area, C represents a sealant-formed area, and D represents the width of an area defined between the end portion of the sealant and the end portion of an upper substrate. B represents the width of a buffer area in the related art and the width of an overlapping area in the present invention. The width of the overlapping area is measured between a first side of the sealant inside of the liquid crystal display device and an end portion of the alignment layer.

As shown in the data of Table 1, there is the buffer area between the alignment layer and the sealant area in the related art liquid crystal display device. However, in the present invention, the buffer area is a measure of how much the alignment layer overlaps the sealant area and thus reduces the width of the non-display area E' in the present invention. That is, the overlapping area of about 0.3 millimeters (mm) along with the elimination of the buffer area B of about 0.4 millimeters (mm) causes the non-display area E' to be reduced by about 0.7 millimeters (mm) as compared to the non-display area E of the related art. Further, the outermost area D' is formed to have a width less than that of the related art by about 0.1 millimeters (mm), i.e., a width of about 0.3 millimeters (mm). As a result, the width of the non-display area E' is reduced by a total of about 0.8 millimeters (mm). Accordingly, the liquid crystal display device can reduce the non-display area by about 30% as compared to the related art while maintaining the same size of the actual display area.

FIG. 5 is a cross-sectional view illustrating the liquid crystal display device shown in FIG. 4. As shown in FIG. 5, a black matrix 20 is formed in a matrix form on an upper substrate 11 to divide the surface of the upper substrate 11 into a plurality of cell areas in which the color filters 16 are to be formed, and to prevent optical interference between adjacent cells. The three primary colors of red, green, and blue are sequentially formed on the upper substrate 11 as color filters 16. As shown in FIG. 5, each of the color filters 16 of the three primary colors is formed by depositing a material on the entire surface of the upper substrate 11 where the black matrix 20 is formed such that the material absorbs white illumination and transmits only a light with a specific wavelength, such as red, green or blue. The common electrode 14 is formed of indium tin oxide (ITO), which is a transparent conductive material, on the color filter where the black matrix 20 and the color filters 16 are formed. Subsequently, a polyimide (PI) is printed on the common electrode 14 and rubbed to form the upper alignment layer 10, thereby completing the upper substrate 11.

On the lower substrate 1, the TFT switching the liquid crystal cell includes a gate electrode 25 projected from a gate line (not shown), a source electrode 28 projected from a data line (not shown), and a drain electrode 30 connected to a pixel electrode 22 through a contact hole 23. Further, the TFT includes a gate insulating layer 6 to insulate the gate electrode 25, the source electrode 28, and the drain electrode 30, and semiconductor layers 26 and 27 to provide a channel region between the source electrode 28 and the drain electrode 30 as a result of a gate voltage supplied to the gate electrode 25. More particularly, the TFT selectively supplies a data signal from the data line to the pixel electrode 22 in response to a gate signal from the gate line.

The pixel electrode 22 is located in a cell area defined by the data lines and the gate lines and is formed of a transparent conductive material with a high light transmittance. The pixel electrode 22 is formed on a protective layer 8 deposited on the entire surface over the lower substrate 1 and electrically connected to the drain electrode through the contact hole 23 formed in the protective layer 8. After printing the lower alignment layer 12 over the lower substrate 1 where the pixel electrode 22 is formed, a rubbing process is carried out to complete the lower substrate 1.

A sealant 40 is formed along the peripheral area of the upper substrate 11 and the lower substrate 1. The sealant 40 has a width measured across the sealant between a side of the sealant within the liquid crystal display device and a side of the sealant on the outside of the liquid crystal display device. The sealant 40 is formed by a printing method or a dispensing method such that the sealant overlaps either or both the upper alignment layer 10 and the lower alignment layer 12 by an amount corresponding to 0 to about 61% of the width of the sealant. Subsequently, spherical-shaped spacers 24 are dispersed between the substrates. Then, the upper substrate 11 and the lower substrate 1 are positioned to be attached to each other. Liquid crystal molecules are then injected and sealed between the substrates to complete the liquid crystal display device.

Because the upper alignment layer 10 and the lower alignment layer 12 are partially overlapped by the sealant 40, the size of the non-display area can be reduced while maintaining the same actual display area. This is because only the size of the non-display area is reduced. Further, since only parts of the upper alignment layer 10 and the lower alignment layer 12 overlap the sealant 40, a stain does not occur due to a non-uniformity of the cell gap. Furthermore, the liquid crystal display device and the fabricating method thereof according to the present invention can have the width of the non-display area reduced by about 30% in comparison with the non-display area in a liquid crystal display device of the related art. Accordingly, the liquid crystal display device and the fabricating method thereof according to the present invention reduce the overall size of a liquid crystal display device while maintaining the same size of the actual display area in the liquid crystal display device.

It will be apparent to those skilled in the art that various modifications and variations can be made in the liquid crystal display device and the fabricating method thereof of the present invention without departing from the spirit or scope of the inventions. Thus, it is intended that the present invention covers the modifications and variations of this invention provided they come within the scope of the appended claims and their equivalents.

What is claimed is:

1. A liquid crystal display having a display area displaying a picture and a non-display area outside the display area, wherein the non-display area comprises:

an alignment layer on at least one of upper and lower substrates and formed from an end portion of the display area; and a sealant between the upper substrate and the lower substrate, wherein the sealant partially overlaps the alignment layer in a vertical direction, wherein a width of an overlapping area between a first side of the sealant inside the display area and an end portion of the alignment layer is about 0.3 millimeters (mm).

2. The liquid crystal display device according to claim 1, wherein the sealant overlaps the alignment layer between 0 to about 61% of a width of the sealant measured across the sealant between a first side of the sealant inside of the display area and a second side of the sealant outside of the display area.

3. The liquid crystal display device according to claim 1, wherein the non-display area comprises a sealant area where the sealant is positioned between the upper and lower substrates, and an outermost area defined between an end portion of the sealant area and an end portion of one of the upper and lower substrates.

4. The liquid crystal display device according to claim 3, wherein a width of the outermost area measured between an end portion of the sealant area and an end portion of one of the upper and lower substrates is about 0.3 millimeters (mm).

5. The liquid crystal display device according to claim 1, wherein a width of the alignment layer from an end portion of the alignment layer to the display area is about 0.9 millimeters (mm).

6. The liquid crystal display device according to claim 1, wherein a width of the sealant measured across the sealant between a first side of the sealant inside of the display area and a second side of the sealant outside of the display area is about 1.1 millimeters (mm).

7. A fabricating method of a liquid crystal display device having a display area displaying a picture and a non-display area outside the display area, comprising:

forming an alignment layer on at least one of an upper substrate and a lower substrate from an end portion of the display area; and forming a sealant between the upper substrate and the lower substrate such that the sealant partially overlaps the alignment layer in a vertical direction, wherein a width of an overlapping area between a first side of the sealant inside the display area and an end portion of the alignment layer is about 0.3 millimeters (mm).

8. The fabricating method according to claim 7, wherein the sealant overlaps the alignment layer between 0 to about 61% of a width of the sealant measured across the sealant between a first side of the sealant inside of the display area and a second side of the sealant outside of the display area.

9. The fabricating method according to claim 7, wherein the non-display area comprises a sealant area where the sealant is positioned between the upper and lower substrates, and an outermost area defined between an end portion of the sealant area and an end portion of one of the upper and lower substrates.

10. The fabricating method according to claim 9, wherein a width of the outermost area measured between an end portion of the sealant area and an end portion of one of the upper and lower substrates is about 0.3 millimeters (mm).

11. The fabricating method according to claim 7, wherein a width of the alignment layer from an end portion of the alignment layer to the display area is about 0.9 millimeters (mm).

12. The fabricating method according to claim 7, wherein a width of the sealant measured across the sealant between the first side of the sealant inside of the display area and a second side of the sealant outside of the display area is about 1.1 millimeters (mm).

* * * * *